Dec. 4, 1945.   J. O. PARR, JR   2,390,322
SEISMIC SURVEYING
Filed Sept. 19, 1941
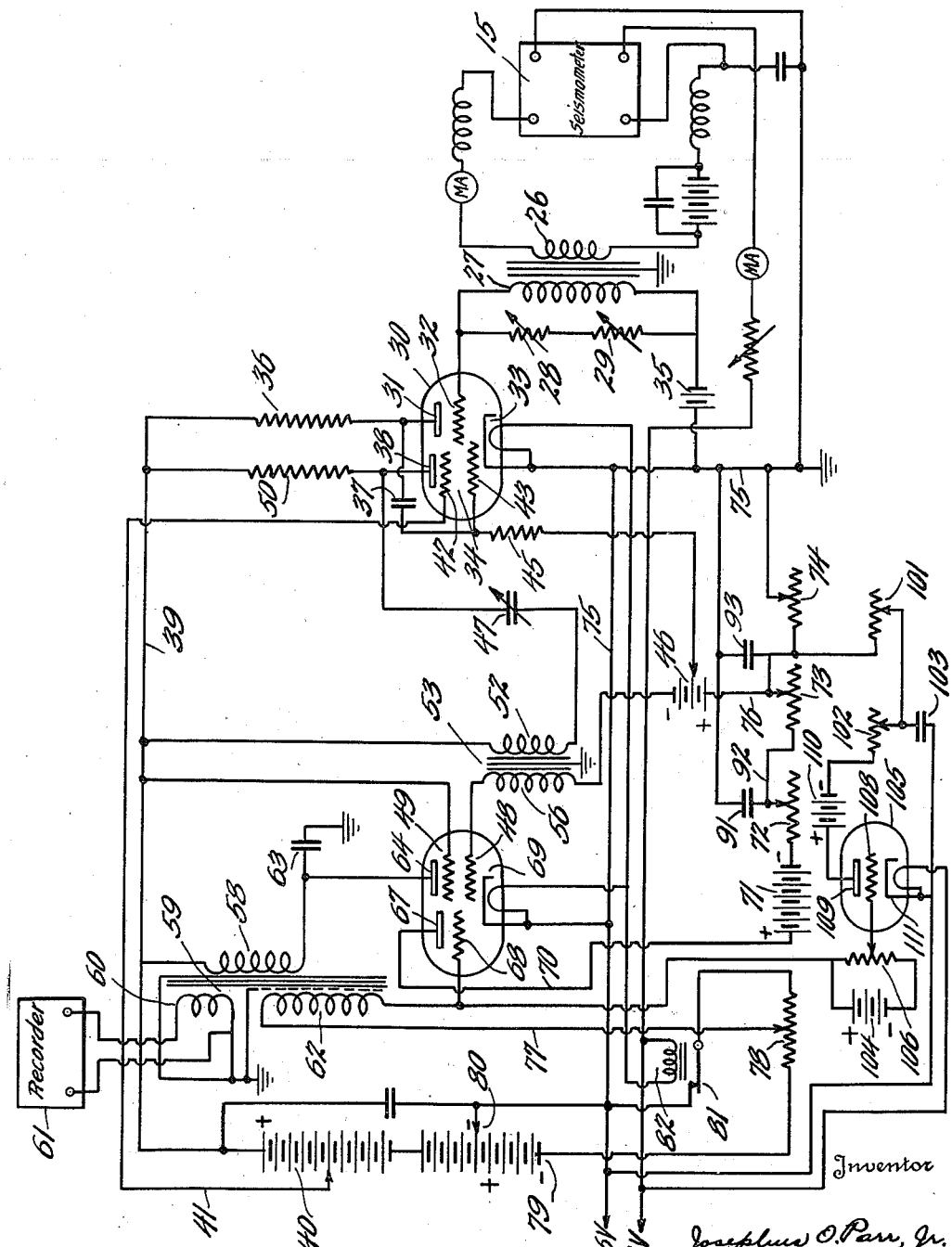
Inventor
Josephus O. Parr, Jr.
By Watson, Cole, Grindle & Watson
Attorney Patented Dec. 4, 1945

2,390,322

UNITED STATES PATENT OFFICE 2,390,322

SEISMIC SURVEYING

Josephus O. Parr, Jr., San Antonio, Tex., assignor to Olive S. Petty, San Antonio, Tex.

Application September 19, 1941, Serial No. 411,479

5 Claims. (Cl. 177—352)

This invention relates to methods of and apparatus for conducting seismic surveys for use in connection with geophysical prospecting, and more particularly to apparatus and methods for recording the seismic wave trains as they arrive at one or more reception points.

It is a general object of the present invention to provide novel and improved apparatus for and methods of recording the arrival times of waves which are received over a period of several seconds and exhibit during that time various intensities or amplitudes, the ratio of the highest to the lowest amplitude being relatively large.

Thus it is well recognized that certain higher energy waves may be received with an intensity of the order of 600 times as great as certain other waves, and it is also noted that during a period following the reception of waves of high amplitude, the wave form energy is gradually attenuated over an appreciable period, usually decaying rather uniformly with time. Thus in order that waves of widely varying amplitude may all be received and recorded by sensitive apparatus on a record sheet or other medium of convenient dimensions, it is highly essential that some means be provided to bring the waves, or the energy derived therefrom, to levels not greatly differing throughout the total time of wave reception.

It has been proposed heretofore to provide seismic apparatus with means functioning automatically to regulate and control the amplitude of the recorded signal for the purpose of compensating, at least in part, for the wide variation in amplitude of the seismic wave trains. One such arrangement is described in the application for U. S. Letters Patent of Olive S. Petty, Serial No. 290,928, filed August 18, 1939, now abandoned. Thus that application discloses, in association with a seismometer or other device for converting seismic impulses into electrical wave form signal energy, an amplifier for such signal energy, the degree of amplification effected in such amplifier being automatically regulated in response to change in amplitude of the seismic waves. However, in this, as in other volume control devices, it is rather important that any compensating change in the sensitivity of the amplifier be somewhat retarded in order to avoid distortion of the record. For example, it is obvious that an automatic volume control responding to voltage variations representative of individual cycles of the wave form signals would not function satisfactorily, and it is therefore customary to employ a time delay device to prevent the functioning of the automatic volume control except when there is a sustained change in amplitude of the incoming energy, such as results from increase or decrease in the mean level of several individual cycles.

Thus with conventional types of automatic volume control, the response of the volume control circuit is ordinarily delayed to such an extent that no substantial immediate alteration of sensitivity occurs when the amplitude of the incoming energy is suddenly and very greatly increased, for example on the arrival of the earlier waves which travel in or slightly below the weathered layer of the earth, and the record of such wave energy is not maintained within reasonable bounds, the trace frequently being not discernible.

It is, therefore, an object of the instant invention to overcome this difficulty by supplementing the usual automatic volume control means with devices which are capable of responding when, and only when, the amplitude of received energy exceeds a predetermined fairly large value, usually considerably in excess of that which can be dealt with by the conventional automatic volume control, for rapidly reducing the size of the record. In order to accomplish the desired result, the amplitude of the recorded signal must be so quickly reduced that some degree of distortion of the record may result, but it is found that such distortion as occurs is preferable to the obscuring of the record trace which results when the conventional A. V. C. alone is used.

More specifically, it is the object of the invention to provide, in seismic apparatus, an electrical wave form amplifier including an automatic volume control acting in response to variation within reasonable limits of the amplitude of the incoming energy to establish a degree of amplification such that the major portion of the record trace may be kept within desired bounds, in combination with devices functioning automatically in response to the arrival of energy of excessive amplitude only for rapidly reducing the amplitude of the record trace to such limits as may be adequately dealt with by the automatic volume control.

Further objects and features of the invention will be apparent from the following description taken in connection with the accompanying drawing, in which the figure is a circuit diagram of an amplifier for wave form electrical signals illustrating one method of applying the instant invention.

In order to facilitate an understanding of the invention, reference will be made to the embodiment thereof illustrated in the accompanying drawing and specific language will be employed. It will nevertheless be understood that various further modifications of the device illustrated herein, such as would fall within the province of those skilled in the art to construct, are contemplated as part of the present invention.

Referring now to the drawing for a better understanding of an actual embodiment of the invention, there is shown in the figure a detector or seismometer 15 of any suitable type adapted to convert seismic energy to wave form electrical signals. These signals are fed into a suitable output circuit which includes the primary 26 of a transformer, the secondary 27 of which is shunted by a pair of variable resistors 28 and 29, one for coarse and one for fine adjustment, for manually setting the level of the signal applied to the amplifier.

The secondary 27 feeds into the cathode and grid of the thermionic valve 30 which constitutes a simple triode amplifier having the anode 31, grid 32, and heated cathode 33 which it shares in common with the elements of the second stage amplifier valve indicated at 34. A suitable biasing battery 35 is arranged in the grid circuit of the triode amplifier. This amplifier is coupled to the second stage amplifier by means of an anode coupling resistor 36 and condenser 37. The anode 31 as well as the anode 38 of the second stage valve receive their voltage supply through the common conductor 39 connected to the positive end of the battery 40. A tap 41 in this battery supplies the screen grid 42 of the second stage amplifier with a somewhat lower potential, permitting more gain and improved automatic volume control. The control grid 43 of the second stage amplifier is coupled by the condenser 37 to the anode of the first stage and receives its bias through resistor 45 from a tap on battery 46. An adjustable coupling condenser 47 and anode resistor 50 provide the coupling between the second stage anode 38 and the control grid 48 of the third stage amplifier valve 49. Condenser 47 acts in the nature of a filter, first to avoid flow of anode current through the primary winding 52 of the interstage coupling transformer 53, thus increasing the transformer life and permitting its design to be more efficient, and second, to vary the frequency response of the amplifier, giving it the highest gain on the desired frequencies and very low gain on undesired frequencies, which effect comes from resonating the transformer primary.

The secondary winding 56 of the interstage transformer 53 connects between the control grid 48 and the bias battery 46. The output from the third stage is fed through the primary 58 of transformer 59, one secondary 60 of which delivers the amplified waves to the moving element of a galvanometer associated with and forming part of a recorder 61. Another secondary 62 takes off a portion of the output of the amplifier for supply to the automatic volume control valve as will be further described hereinafter. The condenser 63 between the anode 64 of the third stage valve and ground serves to by-pass high frequencies and to resonate the output transformer to assist in the desired filter action. At the same time, this condenser performs the important function of assisting in the damping of the moving element of the galvanometer.

In the same envelope with valve 49 is a triode, which may for convenience be referred to as the A. V. C. valve, comprising anode 67, grid 68, and the common heated cathode 69 which functions also with the elements of the third stage amplifier. The anode 67 is connected by wire 70 to a separate source 71 of anode voltage, the negative pole of which leads through variable resistors 72, 73, and 74 back to wire 75 connected to the negative end of the source of heater current and common ground terminal. It will be noted that bias battery 46 is connected by wire 76 to the slider of the resistor 73 and hence is also connected to the ground through resistor 74 which is arranged in shunt with condenser 93. The battery 71 may have a potential of about 45 volts for the type of valve shown, while the value of resistors 72, 73, and 74 may be of the order of 200,000 ohms each. A condenser 91 is connected across resistors 73 and 74 to ground.

The grid 68 of the A. V. C. valve is fed from the secondary 62 of the output transformer 59, the opposite end of which is connected by conductor 77 to the slider of a potentiometer 78 energized from the portion of battery 40 between negative terminal 79 and adjustable tap 80, through the contacts 81 of a relay, the winding 82 of which is in series with the heaters of valves 30 and 49.

The slider on the potentiometer 78 is set to supply a sufficiently negative bias to the control grid 68 of the A. V. C. valve to normally prevent the flow of any anode current in that valve. Preferably the valve is thus biased substantially beyond cut-off, and flow of anode current occurs only during positive swings of the output signal of sufficient magnitude to drive the grid across the cut-off point toward the positive side. Thus whenever the positive potential supplied from the transformer winding 62 becomes sufficiently high, the grid will permit the flow of current to anode 67.

It will be seen that when no current is flowing in the anode circuit of the A. V. C. valve, the positive pole of battery 46 is substantially at ground potential. The bias on grids 43 and 48 of the second and third stage amplifier valves is therefore determined by the potential of the battery 46 and the gain of the amplifier is fixed thereby. However, when current flows in the anode circuit of the A. V. C. valve through the resistors 72, 73 and 74, the potential of the conductor 76 becomes negative with respect to ground by an amount corresponding to the voltage drop across the resistor 74, and the bias on the grids 43 and 48 is thereby rendered more negative to reduce the gain of the amplifier.

Condensers 91 and 93 are of relatively large capacity, for example of the order of one microfarad, and in conjunction with resistances 72 and 73, constitute a time delay circuit preventing immediate reduction of sensitivity in the amplifier on the arrival of the single impulse of large amplitude, the negative bias on the amplifier valves gradually increasing during the arrival of several successive impulses of high amplitude while the condensers 91 and 93 are being charged, so that noticeable distortion is avoided. Again, these condensers hold the charge thereby imparted to them for a considerable period of time, the rate of discharge being determined by the setting of the resistors 73 and 74.

At this point it may be well to consider in more detail the types of waves customarily delivered to the amplifier from the seismometer. When the explosion takes place several types of seismic waves are sent out. The first to be received by the seismometer are those traveling close to the surface of the earth and of large amplitude. These are followed and sometimes overlapped by the waves reflected from various interfaces below the surface of the earth, the reflected waves from the separate interfaces following each other to some extent in accordance with the depths from which they are reflected.

The reflected waves following their first reception by the seismometer attenuate rapidly due to the length of time during which they have been in existence and because the later ones arrive from greater depths and have suffered losses in energy due to their greater paths of travel, absorption in the various media and the like.

The ideal amplifier recorder would be one that recorded all wanted waves with a general level on the record which was nearly uniform. This does not mean that the whole record would be a substantially horizontal straight line, for the individual wave cycles and variations in wave intensities must appear, but there should not be too great variation in their amplitudes. This is for the purpose not only of keeping the record on a reasonable sized chart, but to prevent damage to the recording apparatus, the various galvanometer elements of which are delicate and susceptible to damage if deflected to too great an extent. Furthermore, high amplitudes may cause tangling of these elements in certain types of galvanometers, such as the strings of multiple string galvanometers, and overlapping of the traces thereof on the records, making them difficult to interpret. The higher velocities of the recording elements attributable to greater displacements make the shadows on the record charts form extremely thin lines, sometimes entirely invisible. With the ideal amplifier, these difficulties would be overcome and the chart would consist in a series of records, one for each recording element, in which none of the deflections were of such great magnitude as to interfere with the next trace and yet all were of sufficient magnitude to make it easy to read the record and note the points of inflection of vital importance to obtain the information necessary.

It has already been explained how the reception of waves of greater amplitude than a predetermined value causes functioning of the A. V. C. valve. If this value is set at approximately the amplitude of the first received reflected waves, then the operation of the A. V. C. will cease when the reflected waves begin to arrive at the seismometer and if no means are taken to prevent it, the gain of the amplifier will become normal for the remainder of the operation. This is not desirable since the setting for the original gain would have to be sufficiently low to maintain the first portion of the reflected waves at a reasonable size and the later portion would then be too small for use. The normal gain is therefore set to produce a greater than necessary output from the first of the reflected waves to arrive. The gain is prevented, however, from returning to normal after being reduced by the large primary waves until close to the end of the whole record.

Thus on the arrival of the earlier waves of excessively large amplitude the grid 68 of the A. V. C. valve is driven sufficiently positive by the signal energy derived from the output transformer secondary 62 to cause a flow of current to the anode 67, thereby charging the condensers 91 and 93 and applying a more negative bias to the grids 43 and 48 of the amplifier valves to reduce the gain of the amplifier. The setting of the resistor 78 determining the bias on the A. V. C. valve should be such that each of the swings of the signals derived from these excessively large waves causes the A. V. C. valve to function and therefore the charging of condensers 91 and 93 continues until such waves have passed. The first of the reflected waves may be normally too small to cause functioning of the A. V. C. valve but the gain of the amplifier does not immediately return to normal since the charge on condensers 91 and 93 leaks off slowly and hence the bias on the amplifier grids 43 and 48 becomes more positive gradually. The time required for this charge to leak off can be set by appropriate adjustment of resistor 74 to extend substantially for the time during which it is desired to record the reflected waves, or preferably for a lesser time in order to ensure adequate amplification throughout the record, the gain slowly increasing as the strength of the waves is reduced because of the lowering voltage on 91, producing a chart of reasonably uniform character. In the event of arrival during this period of waves sufficiently large to again render the A. V. C. valve operative, the charging of condensers 91 and 93 is repeated.

As hereinbefore indicated, the A. V. C. system just described, if operated in such a manner as to produce no noticeable distortion in the record, is sufficiently delayed in its action to prevent too rapid reduction of large voltage swings. It is therefore proposed, in accordance with the instant invention, to provide devices affording supplementary control of energy of excessive amplitude.

For this purpose the secondary winding 62 of the output transformer is connected to a potentiometer 106, the slider of this potentiometer being connected to the grid 108 of a valve 105 which functions as a supplementary control valve. A battery 104, in shunt with the resistance element of potentiometer 106, supplies a negative bias voltage to grid 108, and the potentiometer is preferably adjusted so that the valve 105 is biased well beyond the cut-off point and preferably is given a much more negative bias than that applied through the potentiometer 78 to the grid 66. For example, the threshold of operation of the A. V. C. valve may be so set that control voltage is supplied as soon as the swing of the record trace exceeds about ⅜", whereas the supplementary control valve is so biased that there will be no flow of anode current from that valve until the swing of the record trace exceeds 1" or more. The anode 109 of valve 105 may be connected through a battery 110 and through variable resistors 101 and 102 arranged in series to wire 76 and thence to the positive side of battery 46, so as to vary the negative potential supplied to the grids 43 and 48 of the second and third amplifier valves. A condenser 103 is preferably connected between the grounded cathode 111 of valve 105 and a point intermediate the resistors 101 and 102, but may be omitted.

The value of resistors 72 and 73 is fairly high as compared to the value of resistors 101 and 102, and other elements of the circuit just described are so adjusted that the time constant of resistors 101, 102 and condensers 93, 103 is quite short in comparison to the time constant afforded by the resistors 72, 73 and condensers 91, 93, 103, and thus the effect of anode current from the valve 105 is quite rapid. For example, if a string galvanometer is employed as the recording instrument, and the normal A. V. C. would function after the arrival of a signal of excessive amplitude to bring the string vibrations to a usable size within .2 to .3 second, the supplementary control effected by the valve 105 should achieve this result in about .01 second, thus making possible the study of otherwise undiscernible portions of the record trace.

While the instant invention has been applied to a specific type of amplifier for convenience in illustration, it should be understood that the principles of the invention are applicable to apparatus differing widely in construction and mode of operation from that shown herein. Thus in its broader aspect, the invention contemplates the use, in combination with any seismic receiving and recording apparatus in which automatic control of the record trace amplitude is effected, of a supplementary automatic control acting only in response to the arrival of seismic energy of excessively large amplitude for effecting rapid relative reduction of the amplitude of the record trace.

Having thus described the invention, what is claimed as new and desired to be secured by Letters Patent is:

1. In apparatus for use in seismic surveying, the combination with a seismometer for converting incoming seismic energy into electrical wave form signals and means for amplifying and recording such signals, said amplifying means including thermionic valve amplifiers, means for so varying the internal resistance of one of said valves in response to variation in amplitude of such energy as to maintain the major portion of the record within usable amplitude limits, and means responsive only to the arrival of energy of amplitude excessively large as compared to the amplitude of reflected waves for varying the internal resistance of one of said valves with substantially greater rapidity than said first named resistance varying means.

2. In apparatus for use in seismic surveying, the combination with a seismometer for converting incoming seismic energy into electrical waveform signals and means for amplifying and recording such signals, said amplifying means including thermionic valves in circuit, of means automatically operable in response to increase in amplitude of incoming energy above a predetermined amplitude for increasing the internal resistance of at least one of said valves, and means responsive to the arrival of energy of amplitude substantially exceeding said predetermined amplitude only for increasing the internal resistance of at least one of said valves with substantially greater rapidity than said first named resistance increasing means.

3. In apparatus for use in seismic surveying, the combination with a seismometer for converting incoming seismic energy into electrical wave form signals, and means for amplifying and recording such signals, said amplifying means including thermionic valve amplifiers, of means for applying to a control grid of at least one of said valves a bias varying automatically in response to variation in amplitude of incoming energy as to maintain the major portion of the record within usable amplitude limits, time delay means for retarding the application of such varying bias, and means responsive only to the arrival of energy of amplitude which is excessively large as compared to the amplitude of reflected waves for applying a varying bias to the control grid of at least one of said valves with substantially greater rapidity than said first named bias applying means.

4. In apparatus for use in seismic surveying, the combination with a seismometer for converting incoming seismic energy into electrical wave form signals, and means for amplifying and recording such signals, said amplifying means including thermionic valve amplifiers, of a thermionic control valve for applying to a control grid of at least one of said valve amplifiers a bias varying automatically in response to variation in amplitude of incoming energy above a predetermined amplitude, means normally biasing the grid of said control valve beyond cut-off, means applying to the grid of said control valve a bias derived from the incoming signal energy of such value as to render the grid potential more positive than said normal bias, a supplementary control valve for applying to a control grid of at least one of said valve amplifiers a bias varying automatically in response to increase in amplitude of incoming energy above a higher predetermined amplitude, means normally biasing the grid of said supplementary control valve to a point substantially further beyond cut-off than the bias on said first named control valve, and means applying to the grid of said supplementary control valve a bias derived from the incoming signal energy of such value as to render the grid potential less negative than said normal bias.

5. In apparatus for use in seismic surveying, the combination with a seismometer for converting in coming seismic energy into electrical wave form signals, and means for amplifying and recording such signals, said amplifying means including thermionic valve amplifiers, of a thermionic control valve for applying to a control grid of at least one of said valve amplifiers a bias varying automatically in response to variation in amplitude of incoming energy above a predetermined amplitude, means normally biasing the grid of said control valve beyond cut-off, means applying to the grid of said control valve a bias derived from the incoming signal energy of such value as to render the grid potential less negative than said normal bias, a supplementary control valve for applying more rapidly to a control grid of at least one of said valve amplifiers a bias varying automatically in response to increase in amplitude of incoming energy above a higher predetermined amplitude, means normally biasing the grid of said supplementary control valve to a point substantially further beyond cut-off than the bias on said first named control valve, means applying to the grid of said supplementary control valve a bias derived from the incoming signal energy of such value as to render the grid potential more positive than said normal bias, and time delay means associated with said first named control valve for retarding the application thereby of bias to the grid of the valve amplifier to an extent necessary to avoid substantial distortion of the record.

JOSEPHUS O. PARR, Jr.